(12) United States Patent
Hengst

(10) Patent No.: US 10,843,764 B2
(45) Date of Patent: Nov. 24, 2020

(54) CONTROL SYSTEMS AND THROTTLE ASSEMBLIES FOR VEHICLES HAVING HANDLEBARS

(71) Applicant: KA Group AG, Zurich (CH)

(72) Inventor: Aaron Hengst, Willis, TX (US)

(73) Assignee: KA Group AG, Zürich (CH)

( * ) Notice: Subject to any disclaimer, the term of this patent is extended or adjusted under 35 U.S.C. 154(b) by 21 days.

(21) Appl. No.: 16/178,663

(22) Filed: Nov. 2, 2018

(65) Prior Publication Data

US 2019/0135373 A1 May 9, 2019

Related U.S. Application Data

(60) Provisional application No. 62/581,213, filed on Nov. 3, 2017.

(51) Int. Cl.
*B62K 23/06* (2006.01)
*B62K 11/14* (2006.01)
*B62K 5/01* (2013.01)

(52) U.S. Cl.
CPC .............. *B62K 23/06* (2013.01); *B62K 11/14* (2013.01); *B62K 5/01* (2013.01)

(58) Field of Classification Search
CPC ........... B62K 23/06; B62K 11/14; B62K 5/01
See application file for complete search history.

(56) References Cited

U.S. PATENT DOCUMENTS

| | | | |
|---|---|---|---|
| 5,078,023 A | 1/1992 | Scarborough | |
| 5,303,608 A * | 4/1994 | Iwasaki | B62M 25/04 74/489 |
| 6,276,230 B1 | 8/2001 | Crum et al. | |
| 6,658,965 B2 | 12/2003 | Allen | |
| 6,862,948 B1 * | 3/2005 | Calendrille, Jr. | B62K 23/06 74/489 |
| 7,581,464 B2 | 9/2009 | Munz | |

(Continued)

FOREIGN PATENT DOCUMENTS

EP 2079630 A2 7/2009

OTHER PUBLICATIONS http://www.inoveli.com/fv01-accelerator-handle-mechanical; accessed on: Oct. 24, 2018, 6 pages.

(Continued)

*Primary Examiner* — Thomas C Diaz
(74) *Attorney, Agent, or Firm* — Howard & Howard Attorneys PLLC

(57) ABSTRACT

A control system for use by a rider of a vehicle, comprising a handlebar with a grip extending along a grip axis, and a throttle assembly with a housing and mount adapted for attachment to the handlebar along a housing axis arranged coincident to the grip axis and laying in a longitudinal reference plane defining a forward side and a rider side. A thumb trigger is arranged for movement between a first trigger position and a second trigger position, and comprises a thumb pad arranged for engagement by the rider, and a trigger interface supported for rotation about a pivot axis defined by the housing and arranged at an oblique angle relative to the housing axis taken normal to the longitudinal reference plane such that at least a portion of the thumb pad remains on the rider side as the thumb trigger moves between the first and second trigger positions.

16 Claims, 16 Drawing Sheets

(56) References Cited

U.S. PATENT DOCUMENTS

| | | |
|---|---|---|
| 7,735,392 B2 | 6/2010 | Poulos, Jr. et al. |
| 7,806,023 B2 | 10/2010 | Fowler |
| 8,082,819 B2 | 12/2011 | Case et al. |
| 8,256,323 B2 * | 9/2012 | Vellutini ................ B62K 23/06 74/488 |
| 8,887,594 B2 | 11/2014 | Ruth |
| 9,533,571 B1 | 1/2017 | Urmosi |

OTHER PUBLICATIONS

English language abstract not found for EP2079630 A2; however; see English language equivalent WO2008047056 (A2). Extracted from espacenet.com database on Apr. 8, 2019, 1 page.

* cited by examiner

CONTROL SYSTEMS AND THROTTLE ASSEMBLIES FOR VEHICLES HAVING HANDLEBARS

CROSS-REFERENCE TO RELATED APPLICATION

The subject patent application claims priority to and all the benefits of U.S. Provisional Patent Application No. 62/581,213 filed on Nov. 3, 2017, the disclosure of which is hereby incorporated by reference in its entirety.

BACKGROUND OF THE INVENTION

1. Field of the Invention

The present invention relates, generally, to throttle assemblies for vehicles and, more specifically, to control systems and throttle assemblies for vehicles having handlebars.

2. Description of the Related Art

Conventional throttle assemblies known in the art are employed to allow a rider (also sometimes referred to as an "operator" or a "driver") to selectively control operation of a vehicle. To this end, throttle assemblies are used to control vehicle acceleration and modulate vehicle speed, such as by regulating airflow into an internal combustion engine which generates rotational torque used to propel the vehicle. In certain types of vehicles, such as all-terrain vehicles, dirt bikes, snowmobiles, personal watercraft, and the like utilized in the recreational and/or power sports industries, the throttle assembly is arranged for actuation by one of the rider's hands and is typically mounted on a handlebar that is also used to steer the vehicle such that the rider can simultaneously control vehicle steering and acceleration. Here, the rider generally maintains active engagement with the handlebars during vehicle operation to ensure stability of their body relative to the vehicle, compensate for changes in terrain, facilitate transferring body weight to the vehicle in different ways, and the like.

Those having ordinary skill in the art will appreciate that throttle assemblies used in connection with handlebar-equipped vehicles are frequently configured for "twisting" actuation. Such "twist" style throttle assemblies generally comprise a grip which can rotate relative to the handlebar to regulate vehicle speed while also providing support to the rider's hand during vehicle operation. However, depending on the type of vehicle, how the vehicle is used, and the preferences of the rider or rider, "twist" style throttle assemblies may be undesirable. By way of non-limiting example, because the rider is holding onto a rotatable grip, excessive vehicle movement may result in undesired vehicle acceleration or deceleration caused by grip rotation as the rider's body moves relative to the vehicle. Furthermore, in certain applications, the rider may transition between various positions during vehicle operation. By way of example, the rider may frequently switch between riding and seated positions to improve visibility, enhance comfort, transfer weight on the vehicle, and the like. Here, it will be appreciated that changing between positions on handlebar-equipped vehicles generally necessitates that the rider also adjust the throttle assembly or otherwise compensate for the positon change to ensure proper operation of the throttle assembly. By way of non-limiting example, if the rider moves from sitting to standing while on a vehicle with a "twist" throttle assembly, the transition to standing has a tendency to rotate the grip and cause deceleration. Thus, the rider generally has to compensate for this rotation by adjusting their hand position, which may be disadvantageous under certain operating conditions.

In some applications, such as those where "twist" throttle assemblies are undesirable, vehicles may employ finger-actuated or thumb-actuated throttle assemblies. Here, the throttle assembly generally comprises a lever positioned next to a non-rotating grip such that the rider can simultaneously grasp the grip and use their thumb or one of their fingers to actuate the lever to regulate vehicle speed. While the unintended deceleration effect described above in connection with "twist" throttle assemblies is less pronounced with "lever" style throttle assemblies, the rider's ability to maintain engagement with the grip is complicated by the need to actively move their thumb relative to their palm in order to reach and move the lever.

Conventional "lever" style throttle assemblies may employ levers that are difficult for certain riders (e.g., those with relatively small hands) to maintain engagement with because of how they are positioned relative to the grip throughout their range of motion. Here, for example, the lever may be spaced far enough away from the grip so that the rider can fully grasp the grip without inadvertently engaging the lever in emergency braking scenarios. The result of such a lever orientation and configuration is that the rider may be forced to loosen their grasp on the grip under certain vehicle operating conditions. By way of illustrative example, for a rider with relatively small hands, initially engaging the lever may require that their hand be positioned such that there is only minimal engagement between the grip and the anterior surfaces of the extended fingers. Furthermore, when moving the lever to increase vehicle speed, the rider generally extends their thumb forward and underneath the handlebars in order to fully actuate the lever. Here, the rider may have to loosen or otherwise reposition their grasp of the grip, extend their thumb at awkward angles, and/or articulate their wrist to uncomfortable positions.

Certain conventional "lever" style throttle assemblies known in the art employ more ergonomic types of levers that can help prevent the aforementioned problems associated with engagement of the grip. However, these types of throttle assemblies tend to be bulky, expensive to manufacture, and may be impractical for use with certain types of vehicles where the rider frequently changes body position and/or orientation. By way of illustration, while seated on a personal watercraft, the rider's arms generally extend forward toward the handlebars, whereas during standing the rider's arms extend downward. Here, it will be appreciated that if the lever and/or the throttle assembly is too bulky or otherwise difficult to actuate throughout its range of motion, the rider may only be able to access the lever from a limited number of riding positions while maintaining consistent engagement with the grip. For example, certain types of conventional "ergonomic" levers may be designed to position the rider's thumb in a "pocket" or otherwise behind a structural feature that helps guide the thumb into engagement but can significantly limit the rider's ability to engage the lever "pocket" when in certain riding positions. Thus, these types of conventional "ergonomic" levers may limit the rider's ability to transition between sitting and standing, and the rider may be forced to engage the lever in a different manner (e.g., against a surface outside of the "pocket") in certain riding positions. This may result in the rider having to compensate for the change in hand position by applying a substantially different amount of force to the lever in order to achieve the same amount of lever actuation. This too can place strain rider's thumb, wrist, fingers, and the like.

While conventional throttle assemblies have generally performed well for their intended use, there remains a need in the art for a throttle assembly which can operate consistently and reliably when used in in connection with different types of vehicles, which afford comfort and consistent accessibility in a variety of different driving positions, and which can be manufactured and assembled in an efficient and cost-effective manner while, at the same time, affording minimal packaging size and component weight.

SUMMARY OF THE INVENTION

The present invention overcomes the disadvantages in the prior art in a control system for use by a rider of a vehicle. The control system comprises a handlebar, a grip, and a throttle assembly. The handlebar is arranged for engagement by the rider to steer the vehicle, and comprises a handlebar end. The grip is coupled to the handlebar end and extends along a grip axis. The throttle assembly is configured to modulate acceleration of the vehicle, and comprises a housing and a thumb trigger. The housing has a mount adapted for attachment to the handlebar adjacent to the grip. At least a portion of the housing defines a housing axis, and the housing further defines a pivot axis. The housing axis is arranged coincident to the grip axis and lays in a longitudinal reference plane defining a forward side and a rider side. The thumb trigger is arranged for movement relative to the housing between a first trigger position and a second trigger position, and comprises a trigger interface and a thumb pad. The trigger interface is supported for rotation about the pivot axis, and the thumb pad is arranged for engagement by the rider. The pivot axis is arranged at an oblique angle relative to the housing axis taken normal to the longitudinal reference plane such that at least a portion of the thumb pad remains on the rider side as the thumb trigger moves between the first trigger position and the second trigger position.

In addition, the present invention is directed toward a throttle assembly for use by a rider of a vehicle having a handlebar with a grip coupled to the handlebar and extending along a grip axis. The throttle assembly comprises a housing and a thumb trigger. The housing has a mount adapted for attachment to the handlebar adjacent the grip. At least a portion of the housing defines a housing axis, and the housing further defines a pivot axis. The housing axis is arranged coincident to the grip axis and lays in a longitudinal reference plane defining a forward side and a rider side. The thumb trigger is arranged for movement relative to the housing between a first trigger position and a second trigger position, and comprises a trigger interface and a thumb pad. The trigger interface is supported for rotation about the pivot axis, and the thumb pad is arranged for engagement by the rider. The pivot axis is arranged at an oblique angle relative to the housing axis taken normal to the longitudinal reference plane such that at least a portion of the thumb pad remains on the rider side as the thumb trigger moves between the first trigger position and the second trigger position.

In this way, the control system and throttle assembly of the present invention afford improved functionality and usability in connection with handlebar-equipped vehicles while, at the same time, reducing the cost and complexity of manufacturing and assembling throttle assemblies which can operate reliably and predictably in a number of different operating conditions.

BRIEF DESCRIPTION OF THE DRAWINGS

Advantages of the present invention will be readily appreciated as the same becomes better understood by reference to the following detailed description when considered in connection with the accompanying drawings.

DETAILED DESCRIPTION OF THE EMBODIMENTS

Figure 1:
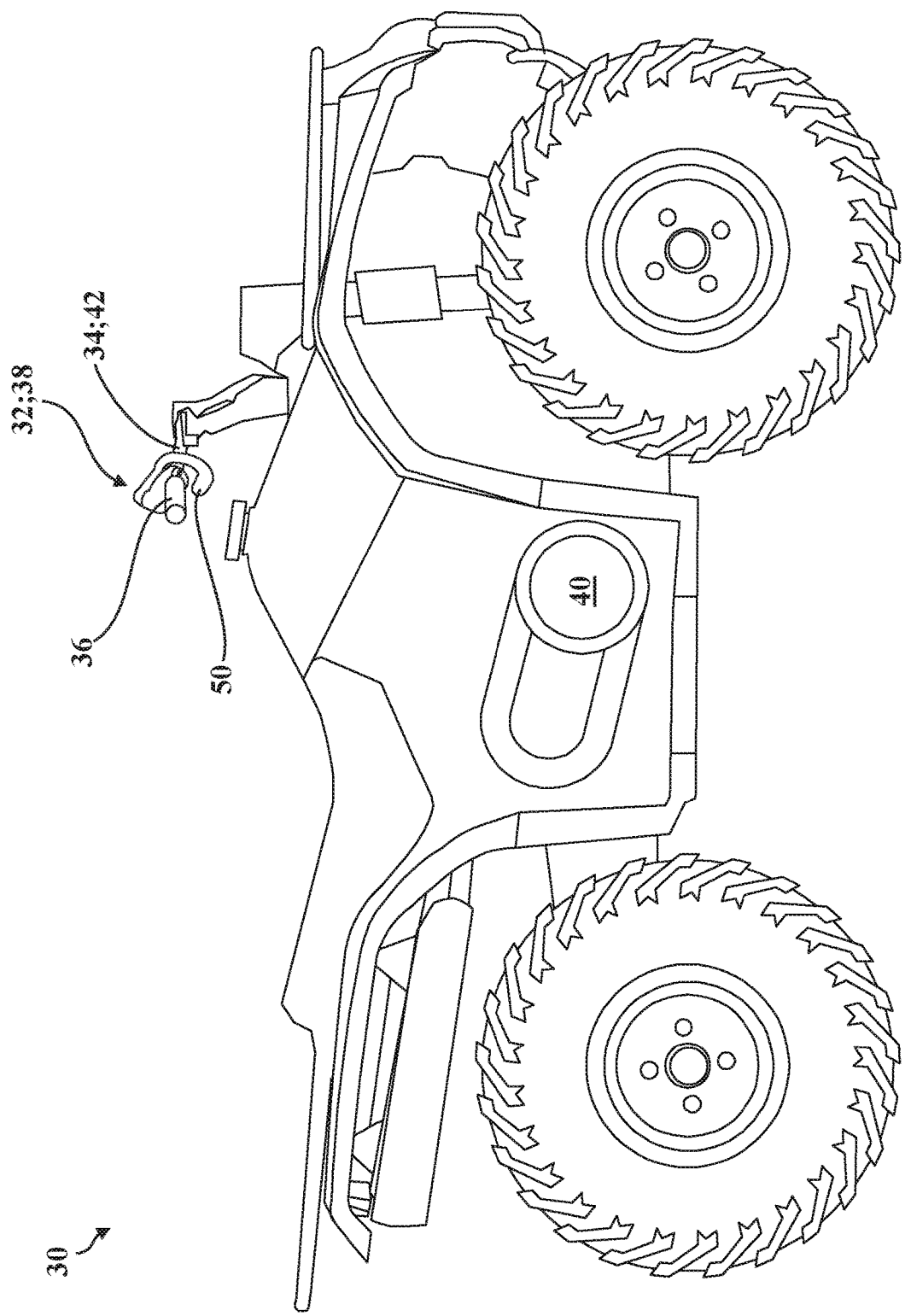
FIG. 1 is right-side plan view of a vehicle having a control system with handlebars and a throttle assembly according to one embodiment of the present invention.

Referring now to the drawings, where like numerals indicate like or corresponding parts throughout the several views, a vehicle is generally shown at 30 in FIG. 1. The vehicle 30 comprises a control system 32 for use by rider (sometimes called an "operator" or a "driver") of the vehicle 30. In the representative embodiment illustrated herein, the control system 32 includes one or more handlebars 34, grips 36, and a throttle assembly 38, each of which will be described in greater detail below.

The handlebars 34 are arranged for engagement by the rider to steer the vehicle 30 during use, and generally support the grips 36 which provide support to the rider's hands. The handlebars 34 also support the throttle assembly 38, which is adapted to enable the rider to control vehicle 30 acceleration and modulate speed, such as by regulating airflow into an internal combustion engine 40 which generates rotational torque used to propel the vehicle 30. However, those having ordinary skill in the art will appreciate that the throttle assembly 38 could be used to facilitate control of vehicles 30 which utilize different types of powertrains, such as electric powertrains, hybrid powertrains, and the like.

While the vehicle 30 depicted in FIG. 1 is realized as an all-terrain vehicle, it will be appreciated that the vehicle 30 could be of any suitable type or configuration which employs handlebars 34 to facilitate steering, or which could otherwise utilize hand-operated throttle controls. By way of non-limiting illustration, the vehicle 30 could similarly be realized as a dirt bike, a motorcycle, a personal watercraft, a snowmobile, and the like configured for use in a number of different industries and environments including recreational use, power sports and racing, commercial use, general transportation, and the like. Thus, those having ordinary skill in the art will appreciate that the vehicle 30 itself does not form part of the present invention and could be of a number of different types or configurations.

Figure 2A:
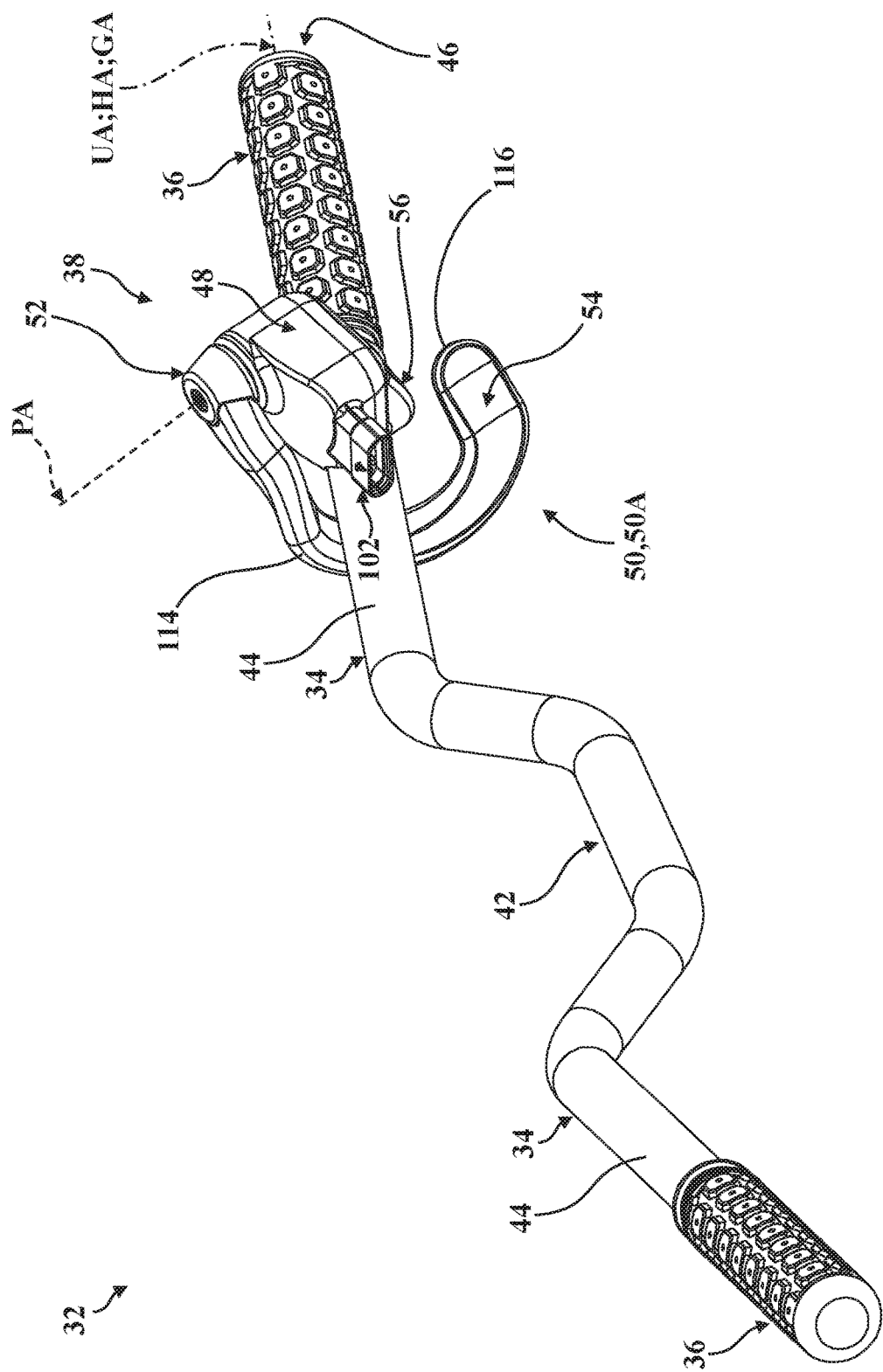
FIG. 2A is a perspective view of the handlebars and the throttle assembly of the vehicle of FIG. 1, shown with the throttle assembly shown having a thumb trigger arranged in a first trigger position about a pivot axis.
Figure 2B:
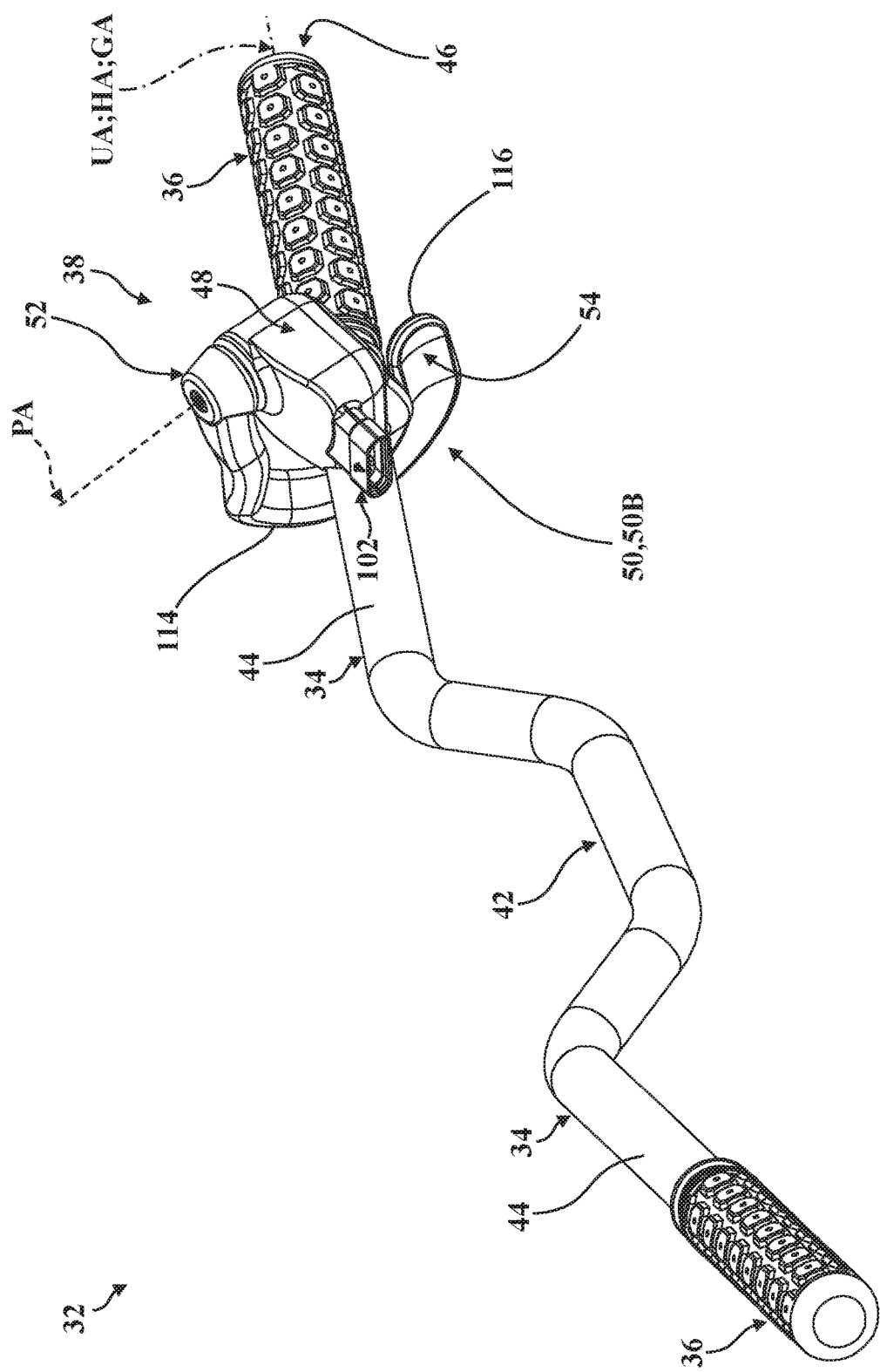
FIG. 2B is another perspective view of the handlebars and the throttle assembly of FIG. 2A, shown with the thumb trigger arranged in a second trigger position.

Referring now to FIGS. 2A-2B, the handlebars 34, the grips 36, and the throttle assembly 38 of the control system 32 are shown in greater detail. In the illustrated embodiment, the handlebars 34 are defined by a single handlebar assembly 42 which is formed as a unitary, one-piece component, such as from a cylindrical tube which is bent or otherwise formed to shape. However, those having ordinary skill in the art will appreciate that the handlebars 34 could be formed separately from each other (e.g., "clip-on" handlebars) without departing from the scope of the present disclosure. Other configurations are contemplated. Each of the handlebars 34 of the handlebar assembly 42 is defined by a generally cylindrical region 44 which extends to a respective handlebar end 46 to which one of the grips 36 is coupled. The grips 36 provide the rider a place to position their hands to steer the vehicle 30 and afford support to the rider during use. In the illustrated embodiment, the throttle assembly 38 is operatively attached to the handlebar 34 so as to be engaged by the rider's right hand, as is convention.

The cylindrical region 44 of the handlebar 34 on the right side of the handlebar assembly 42 defines a handlebar axis HA, and the grip 36 coupled to the handlebar end 46 defines a grip axis GA. In the representative embodiment illustrated herein, the grip axis GA is aligned with the handlebar axis HA. As will be appreciated from the subsequent description below, the grip axis GA and the handlebar axis HA are used herein to describe movement and operation of the control system 32 and/or the throttle assembly 38. Because certain embodiments of the present invention do not include the handlebars 34 and/or the grips 36, it will be appreciated that the handlebar axis HA, the grip axis GA, the handlebars 34, and/or the grips 36 can be configured and/or defined in a number of different ways. Specifically, while the handlebar axis HA and the grip axis GA are depicted as a single, straight line throughout the drawings, it will be appreciated that these axes HA, GA, could be arranged or defined differently without departing from the scope of the present invention. By way of illustration, the handlebar could comprise a curved region adjacent to the handlebar end with a grip coupled to the curved region (not shown), and the "handlebar axis" could be defined by a curved path defined by or otherwise aligned to the curved region of the handlebar.

Referring now to FIGS. 2A-10B, as is described in greater detail below, the throttle assembly 38 generally comprises a housing 48 and a thumb trigger 50 that is movable relative to the housing 48 about a pivot axis PA between a first trigger position 50A (see FIG. 2A; see also FIGS. 3A, 4A, 5A, 6A, and 10A) and a second trigger position 50B (see FIG. 2B; see also FIGS. 3B, 4B, 5B, 6B, and 10B) to modulate vehicle 30 acceleration. As is described in greater detail below, the thumb trigger 50 comprises a trigger interface 52 supported for rotation about the pivot axis PA, and a thumb pad 54 arranged for engagement by the rider. In addition to the housing 48 and the thumb trigger 50, the illustrated embodiment of the throttle assembly 38 also includes a mount 56, a cover 58, a pivot shaft 60, a biasing element 62, and a printed circuit board assembly 64 (see FIGS. 7-9). Each of the components introduced above will be described in greater detail below.

Figure 10A:
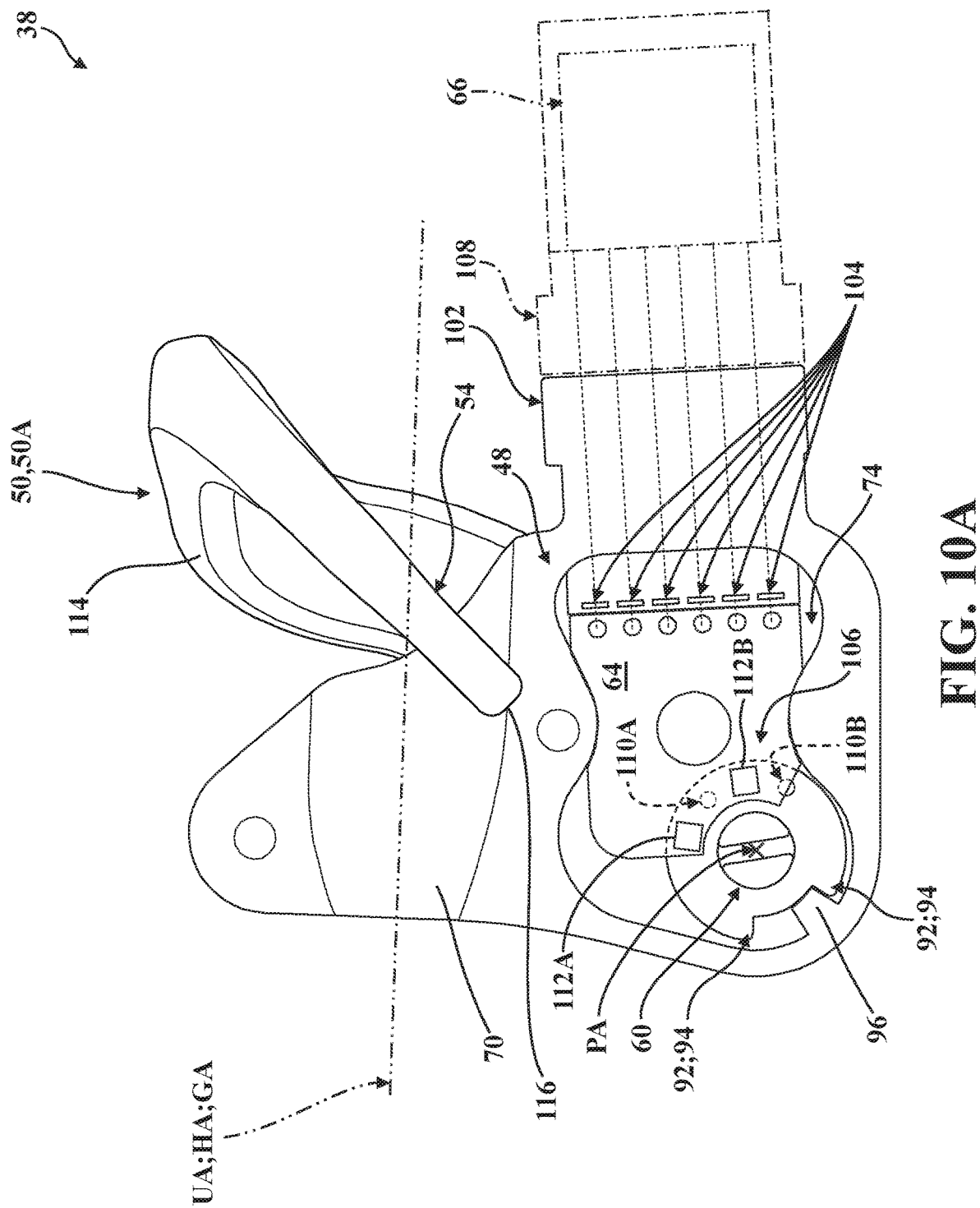
FIG. 10A is a schematic view depicting portions of the throttle assembly of FIGS. 2A-9, shown with the thumb trigger arranged in the first trigger position.
Figure 10B:
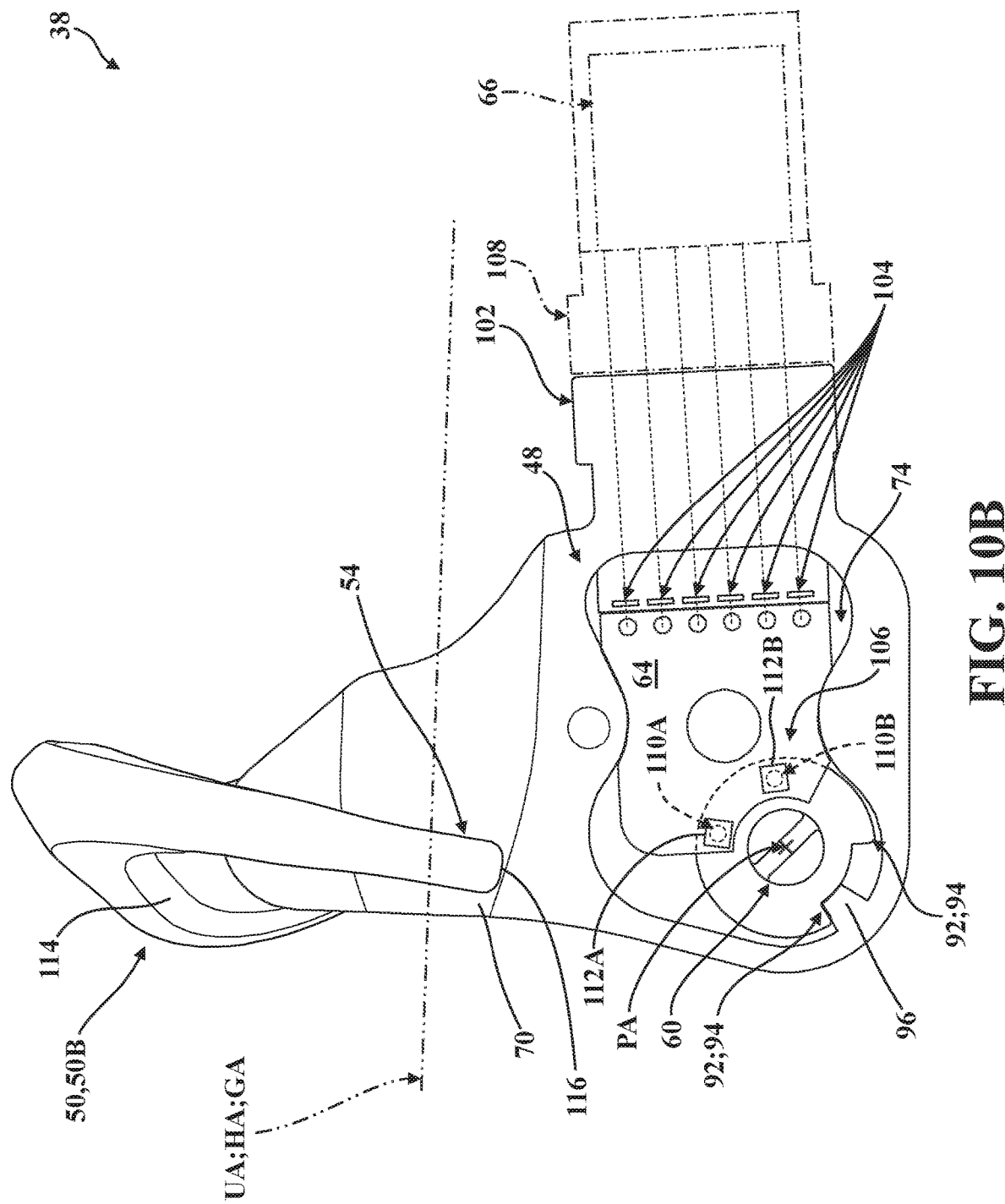
FIG. 10B is another schematic view depicting portions of the throttle assembly of FIGS. 2A-10A, shown with the thumb trigger arranged in the second trigger position.

In the representative embodiment illustrated herein, the throttle assembly 38 is realized as a "drive-by-wire," electronic throttle assembly 38 configured to communicate electrical signals to a controller, depicted schematically at 66 in FIGS. 10A-10B (for example, an "electronic control unit"), where the electrical signals are representative of the relative position of the thumb trigger 50 between the trigger positions 50A, 50B, as described in greater detail below. The controller 66, in turn, is responsive to the electrical signals and can adjust operation of the engine 40 of the vehicle 30 in response. By way of non-limiting example, the engine 40 could comprise a motor-driven throttle valve (not shown) actuated by the controller 66 to regulate airflow into the engine 40, and the controller 66 could be configured to close the throttle valve when the thumb trigger 50 is in the first trigger position 50A (see FIG. 2A) and to drive the throttle valve fully open when the thumb trigger 50 is in the second trigger position 50B (see FIG. 2B). Put differently, the first trigger position 50A could represent "idle," the second trigger position 50B could represent "wide-open throttle," and the thumb trigger 50 could be movable to a number of different positions between the first and second trigger positions 50A, 50B. It will be appreciated that electrical communication between the throttle assembly 38 and the controller 66 can be achieved in a number of different ways without departing from the scope of the present invention. Moreover, while the representative embodiment of the throttle assembly 38 depicted herein is realized as an electronic "drive-by-wire" throttle assembly 38, it will be appreciated that the a "cable-driven" arrangement could be utilized in certain embodiments without departing from the scope of the present invention.

Figure 6A:
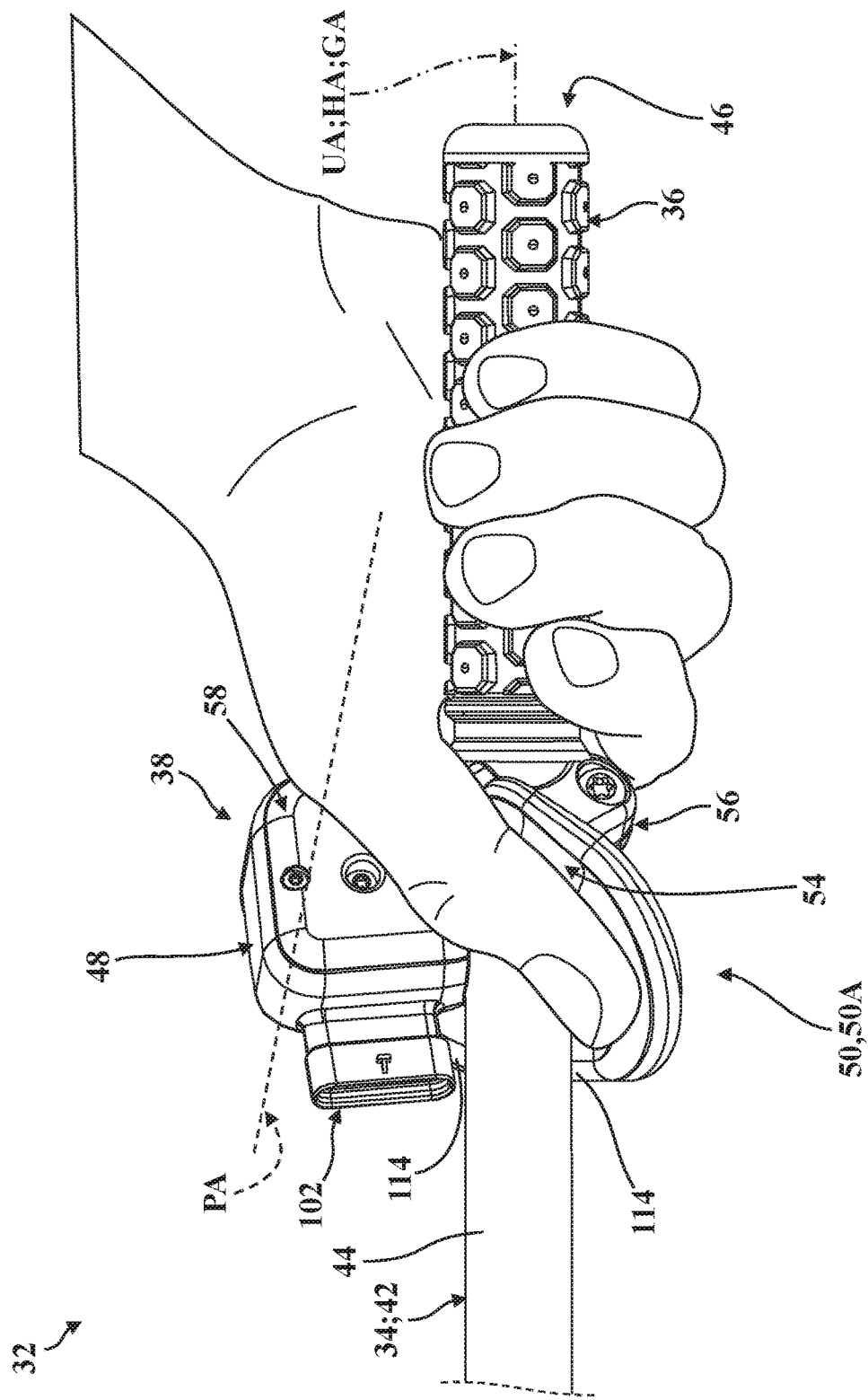
FIG. 6A is a partial side view of the handlebars and the throttle assembly of FIGS. 2A-5B, shown with the thumb trigger arranged in the first trigger position.
Figure 6B:
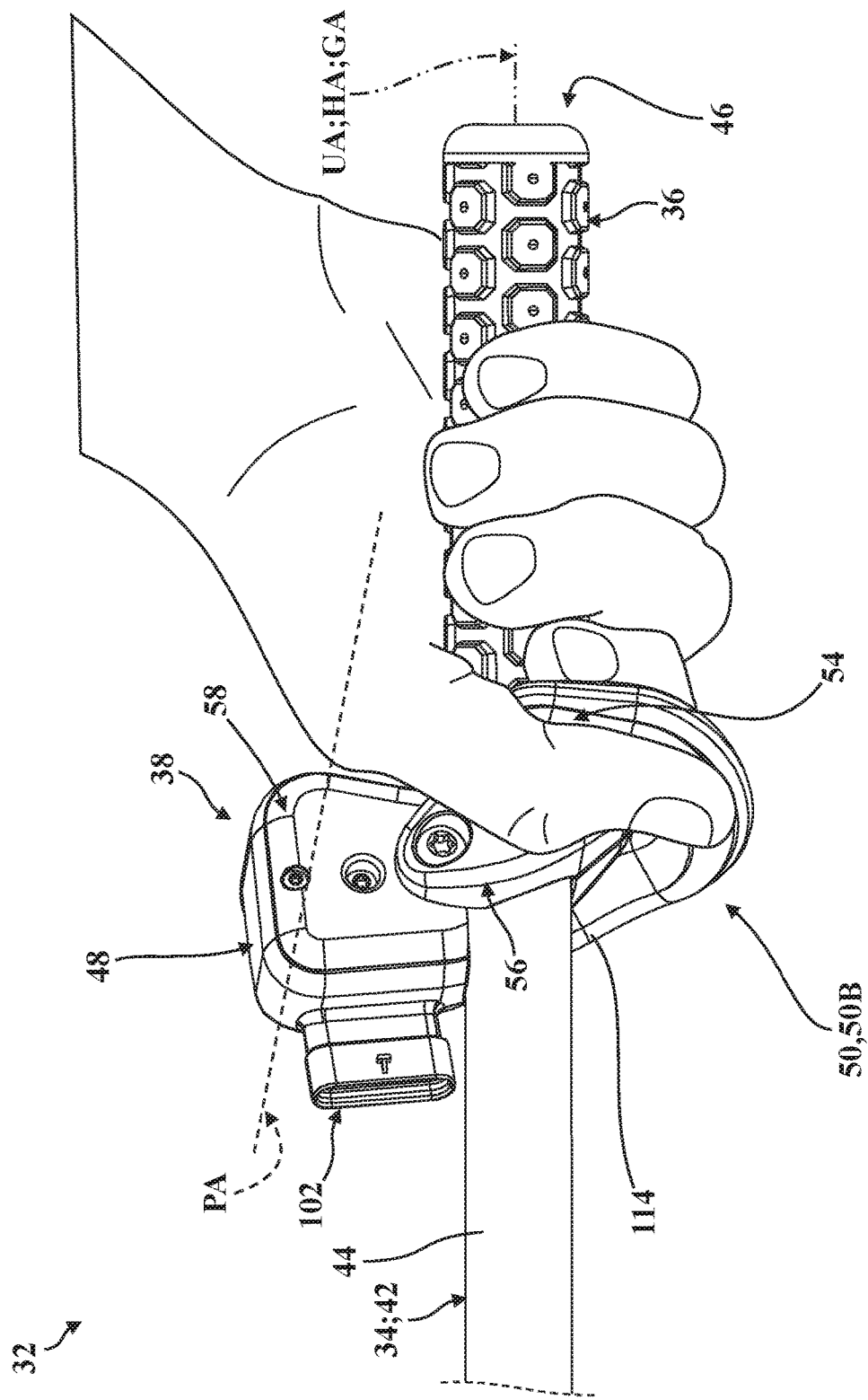
FIG. 6B is another partial side view of the handlebars and the throttle assembly of FIG. 6A, shown with the thumb trigger arranged in the second trigger position.
Figure 7:
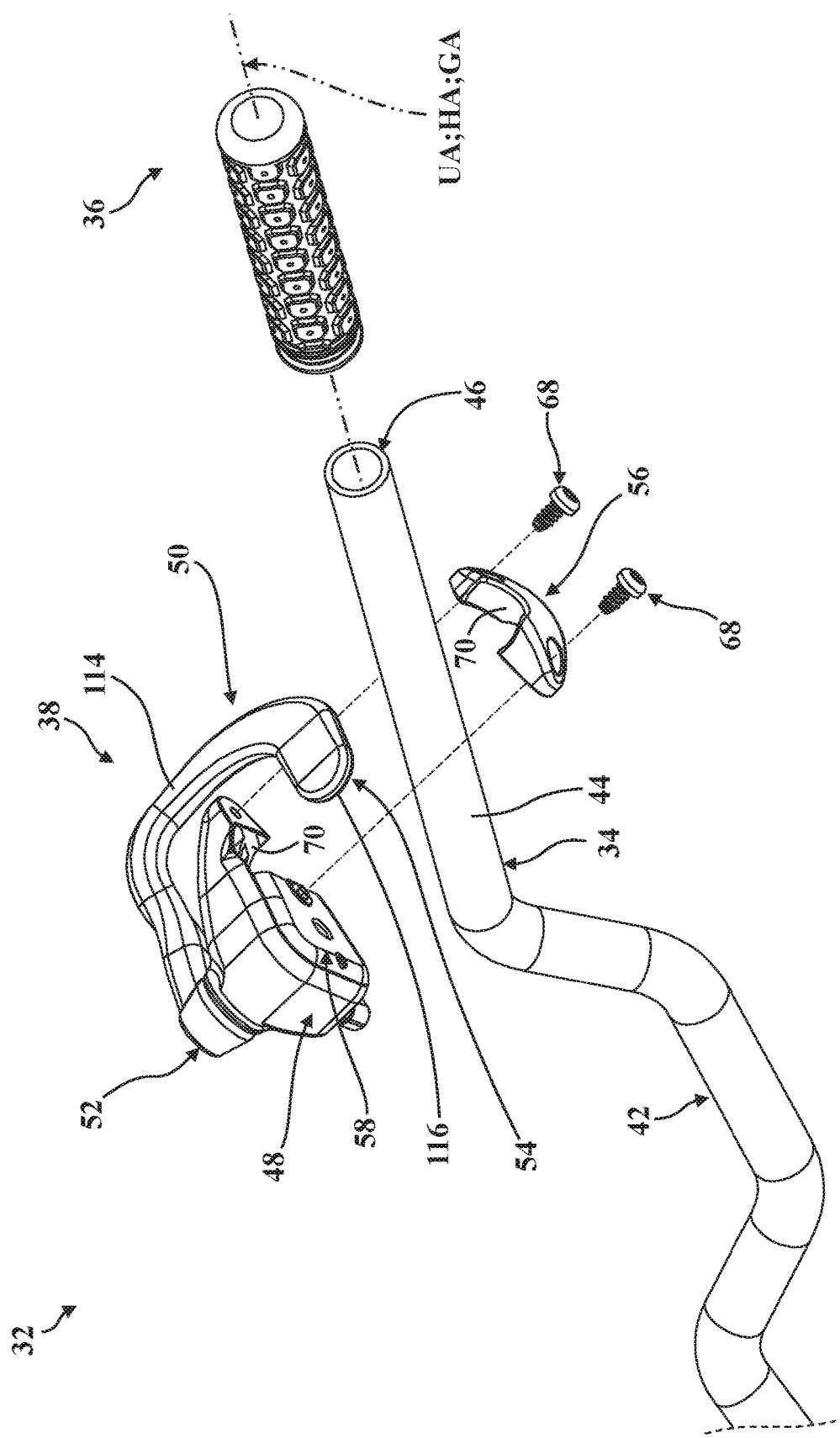
FIG. 7 is a partially-exploded perspective view of the handlebars and the throttle assembly of FIGS. 2A-6B
Figure 8:
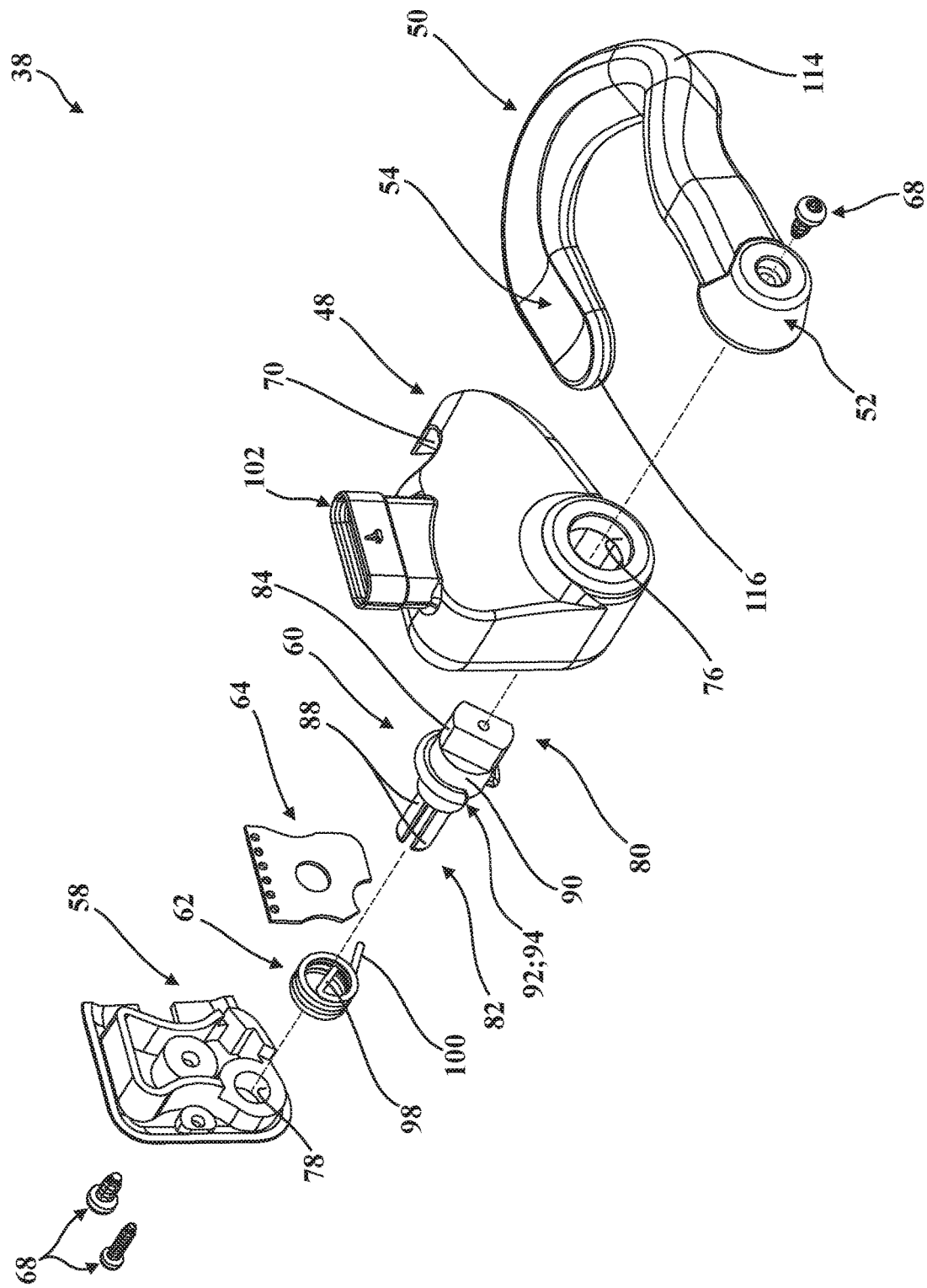
FIG. 8 is an exploded perspective view of a portion of the throttle assembly of FIGS. 2A-7.

With continued reference to FIGS. 2A-10B, the housing 48 of the throttle assembly 38, along with the mount 56, is adapted for attachment to the handlebar 34 adjacent to the grip 36 (see FIG. 7). To this end, the mount 56 is removably secured to the housing 48 via fasteners 68, and both the mount 56 and the housing 48 comprise contact surfaces, generally indicated at 70, which are shaped and arranged to engage against respective portions of the cylindrical region 44 to "clamp" the throttle assembly 38 to the handlebars 34. While the housing 48 and the mount 56 are formed as separate components in the illustrated embodiment, it is contemplated that all or a portion of the mount 56 could be formed integrally with the housing 48 in other embodiments. As is described in greater detail below, the housing 48 defines the pivot axis PA as well as a housing axis UA which is arranged coincident with to the grip axis GA. In the representative embodiment illustrated herein, the housing axis UA is arranged coincident with both the grip axis GA and the handlebar axis HA, and is generally defined by the contact surface 70 of the housing 48. However, it is contemplated that another portion of the housing 48 could define the housing axis UA in other embodiments.

Figure 3A:
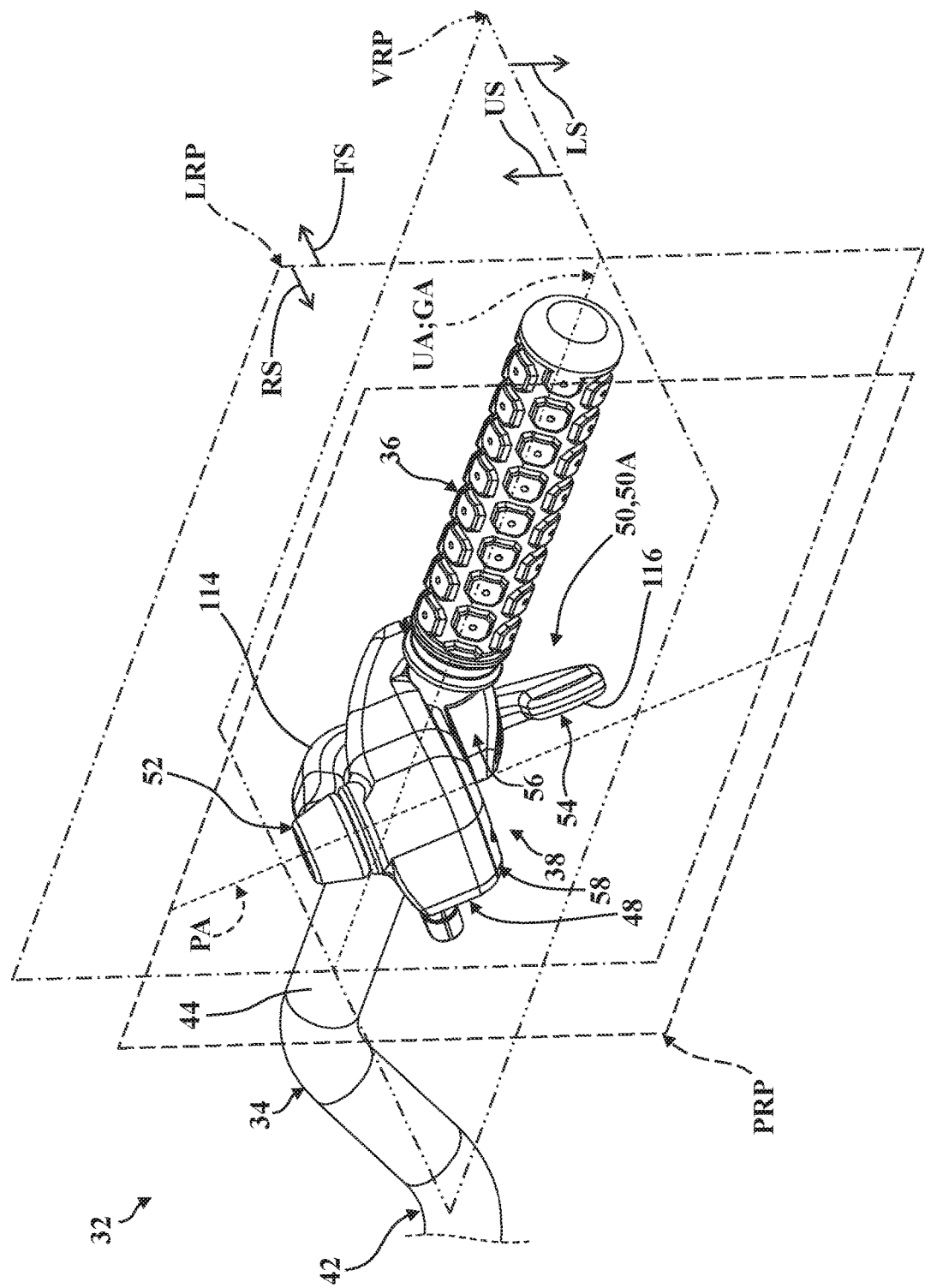
FIG. 3A is a partial perspective view of the handlebars and the throttle assembly of FIGS. 2A-2B, shown with the thumb trigger arranged in the first trigger position, and depicting a housing axis laying in perpendicularly-arranged longitudinal and vertical reference planes and with the pivot axis laying in a pivot reference plane.
Figure 3B:
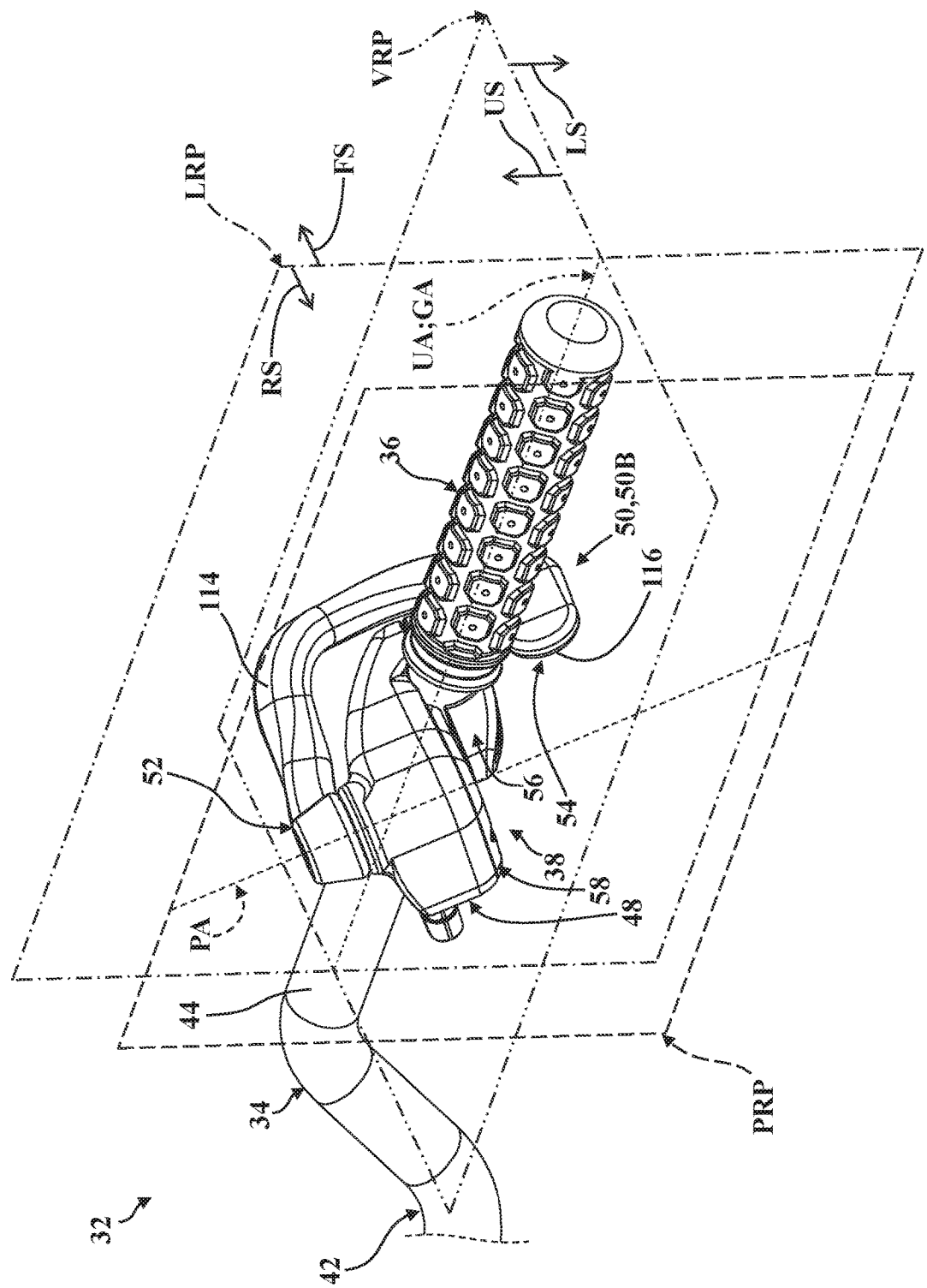
FIG. 3B is another partial perspective view of the handlebars and the throttle assembly of FIG. 3A, shown with the thumb trigger arranged in the second trigger position.

As is best shown in FIGS. 3A-3B, the housing axis UA is arranged laying in a longitudinal reference plane LRP that defines a forward side FS and an opposing rider side RS. Here, the forward side FS generally faces away from the rider during operation of the vehicle 30, while the rider side RS generally faces towards the rider. The housing axis UA is also disposed laying in a vertical reference plane VRP arranged perpendicular to the longitudinal reference plane LRP. The vertical reference plane VRP defines an upper side US and an opposing lower side LS. Here, the upper side US generally faces toward the sky and the lower side LS generally faces toward the ground. Furthermore, as shown in FIGS. 3A-3B, the pivot axis PA is disposed laying in a pivot reference plane PRP, which is shown arranged parallel to the longitudinal reference plane LRP in the illustrated embodiment.

Figure 4A:
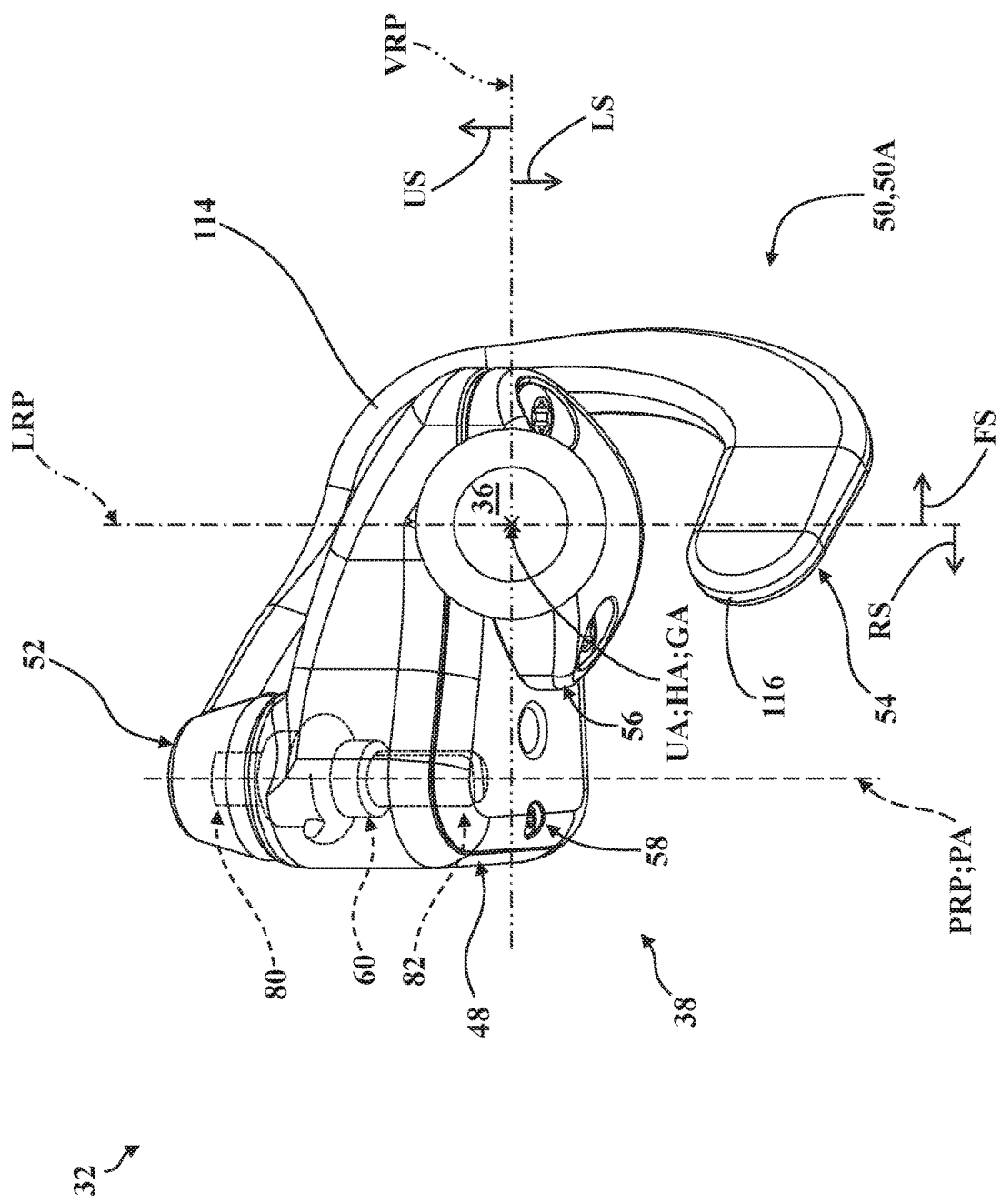
FIG. 4A is an end view depicting a portion of the handlebars and the throttle assembly of FIGS. 2A-3B taken perpendicular to the housing axis, shown with the thumb trigger arranged in the first trigger position, the throttle assembly shown having a pivot shaft depicted in phantom and supported by a housing for rotation about the pivot axis.
Figure 4B:
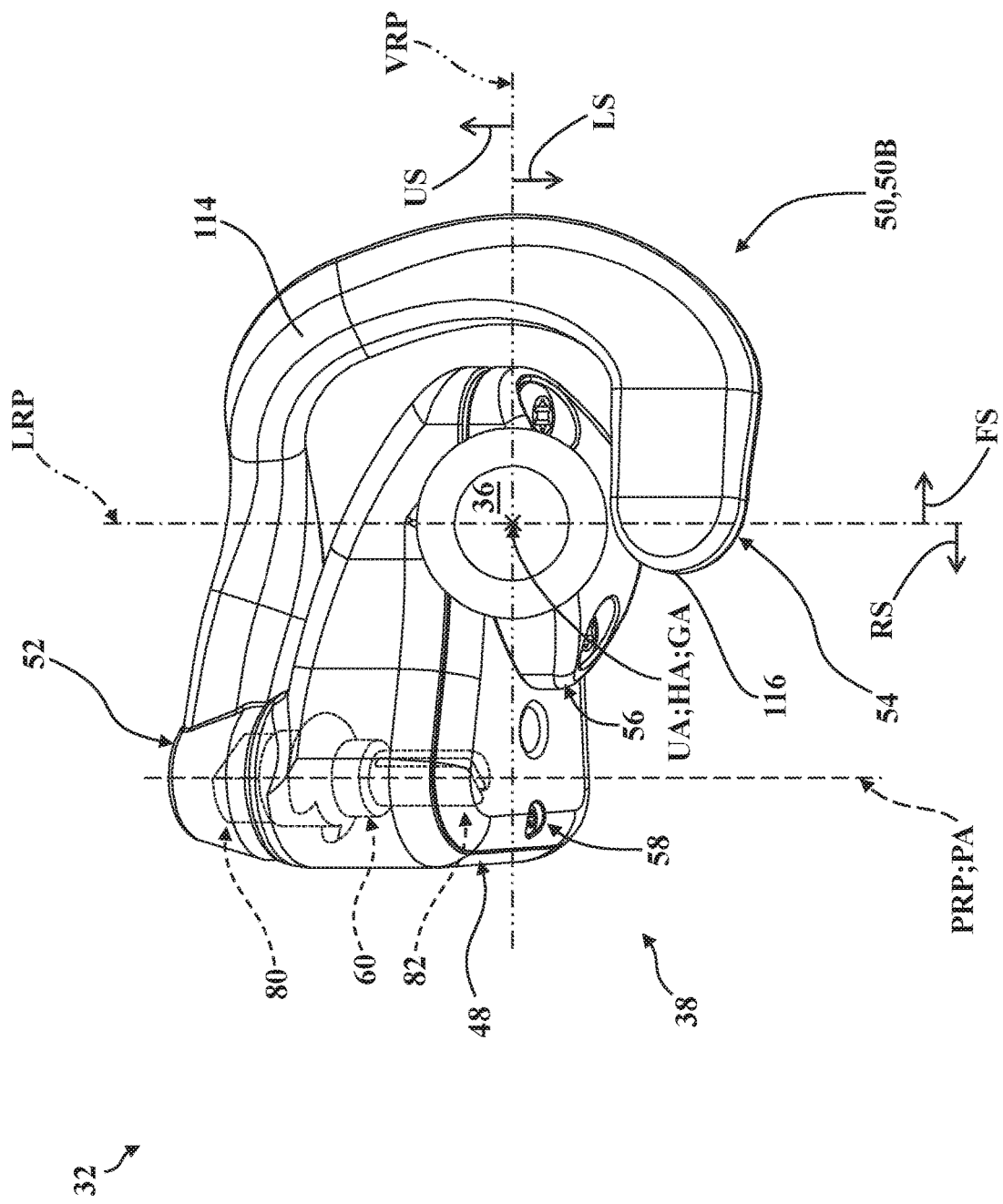
FIG. 4B is another end view of the portion of the handlebars and the throttle assembly of FIG. 4A, shown with the thumb trigger arranged in the second trigger position.
Figure 5A:
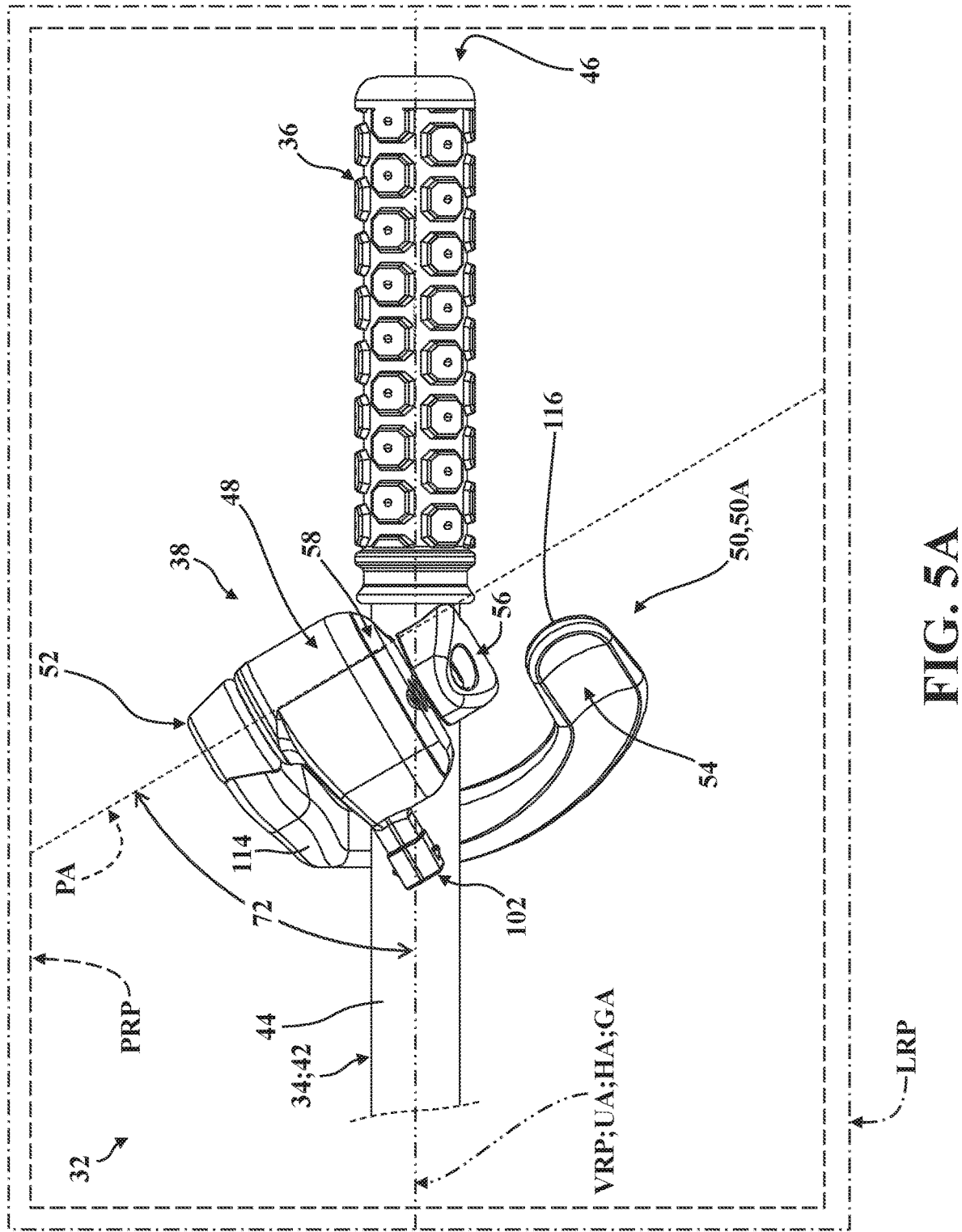
FIG. 5A is a partial front-side view of the handlebars and the throttle assembly of FIGS. 2A-4B, shown with the thumb trigger arranged in the first trigger position.
Figure 5B:
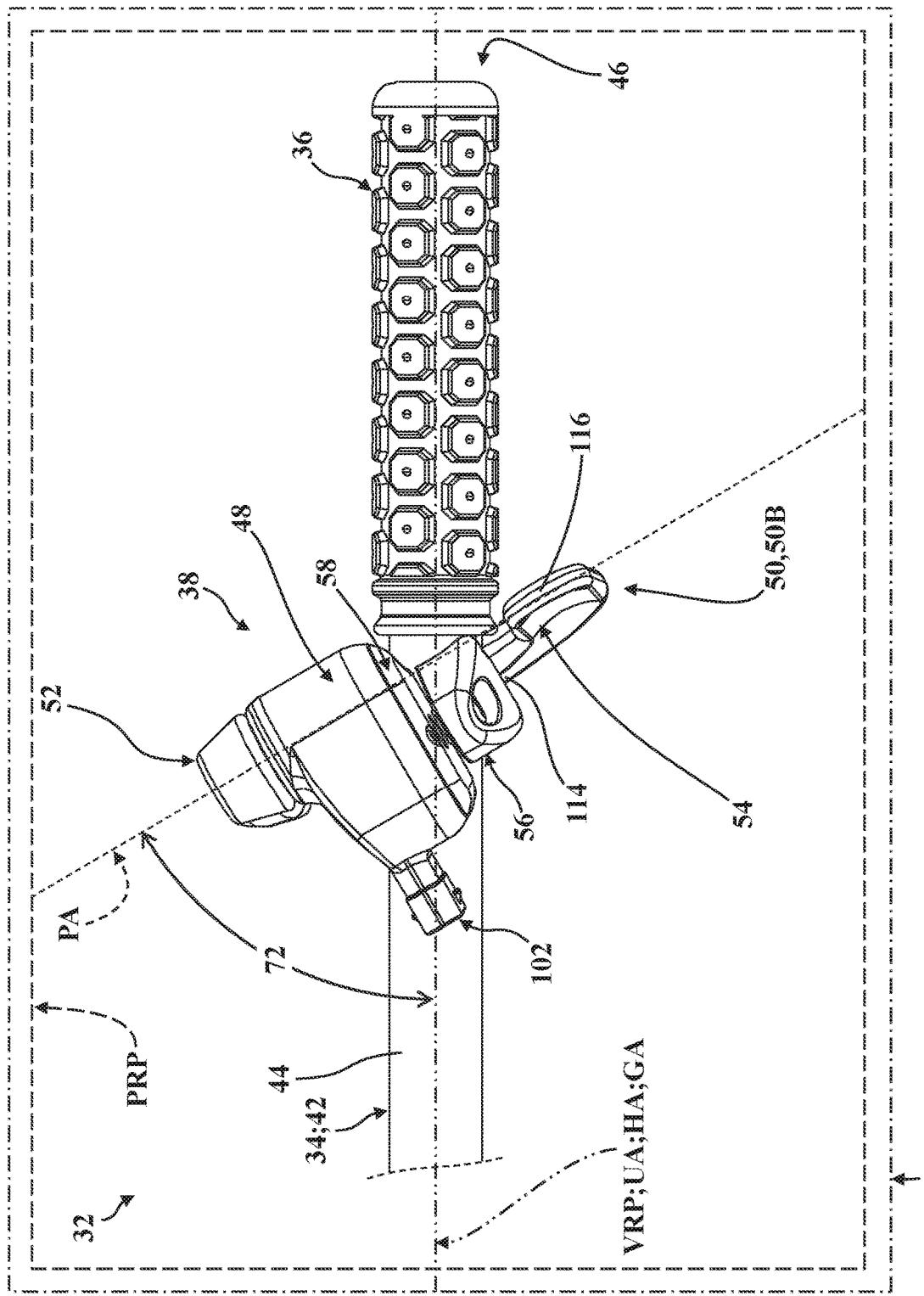
FIG. 5B is another partial front-side view of the handlebars and the throttle assembly of FIG. 5A, shown with the thumb trigger arranged in the second trigger position.

As will be appreciated from the subsequent description below, the longitudinal reference plane LRP, the vertical reference plane VRP, and the pivot reference plane PRP are utilized herein in order to help illustrate and describe operation of the control system 32 based on relative movement of certain components of the throttle assembly 38. Because the throttle assembly 38 can be "clocked" about the grip axis GA, and because the left-side and right-side cylindrical regions 44 of the handlebars 34 generally extend non-parallel to each other in conventional vehicle 30 applications, those having ordinary skill in the art will appreciate that the forward side FS and the rider side RS merely serve to differentiate respective opposing sides of the longitudinal reference plane LRP and do not necessarily correspond to an orientation or configuration of the vehicle 30. Similarly, it will be appreciated that the upper side US and the lower side LS merely serve to differentiate respective opposing sides of the vertical reference plane VRP and do not necessarily correspond to an orientation or configuration of the vehicle 30. FIGS. 5A-5B are orientated normal to the longitudinal reference plane LRP (depicted as a rectangle with dash-dot-dash lines; see also FIGS. 3A-3B) facing toward the forward side FS from the rider side RS. In FIGS. 5A-5B, the pivot reference plane PRP (arranged parallel to the longitudinal reference plane LRP in the illustrated embodiment) is depicted as a rectangle with dash-dash lines (see also FIGS. 3A-3B). FIGS. 4A-4B are orientated normal to the housing axis UA, shown with the longitudinal reference plane LRP depicted as a dash-dot-dash line, with the vertical reference plane VRP depicted as a dash-dot-dot-dash line, and with the pivot reference plane PRP depicted as a dash-dash line.

Referring again to FIGS. 2A-10B, As noted above, the trigger interface 52 of the thumb trigger 50 is supported for rotation about the pivot axis PA defined by the housing 48. The pivot axis PA is arranged at an oblique angle 72 relative to the housing axis UA (see FIGS. 5A-5B) taken normal to the longitudinal reference plane LRP such that at least a portion of the thumb pad 54 remains on the rider side RS of the longitudinal reference plane LRP as the thumb trigger 50 moves between the first trigger position 50A and the second trigger position 50B (compare FIGS. 4A-4B). As is described in greater detail below, this arrangement allows for the thumb trigger 50 to move in a "sweeping" manner about the pivot axis PA relative to the housing 48 (and, thus, relative to the grip 36 and the handlebars 34) in a way that follows the natural movement of the rider's thumb throughout the full range of motion between the first and second trigger positions 50A, 50B without reducing the rider's ability to maintain firm engagement with the grip 36 (see FIGS. 6A-6B).

In some embodiments, the oblique angle 72 is between 50-degrees and 70-degrees. In the representative embodiment illustrated herein, the oblique angle 72 is substantially equal to 60-degrees (see FIGS. 5A-5B). As noted above, the pivot axis PA is arranged laying in the pivot reference plane PRP, which is disposed parallel to and spaced from the longitudinal reference plane LRP in the illustrated embodiment (see FIGS. 4A-4B). However, it will be appreciated that the pivot reference plane PRP could be arranged differently in certain embodiments. By way of non-limiting example, it is contemplated that the pivot reference plane PRP could be non-parallel to the longitudinal reference plane LRP such that the pivot axis PA would intersect the vertical reference plane VRP at a second oblique angle (not shown) taken normal to the housing axis UA (e.g., viewed from the orientation presented in FIGS. 4A-4B) such that at least a portion of the thumb pad 54 remains on the rider side RS of the longitudinal reference plane LRP as the thumb trigger 50 moves between the first trigger position 50A and the second trigger position 50B. Other configurations are contemplated.

Figure 9:
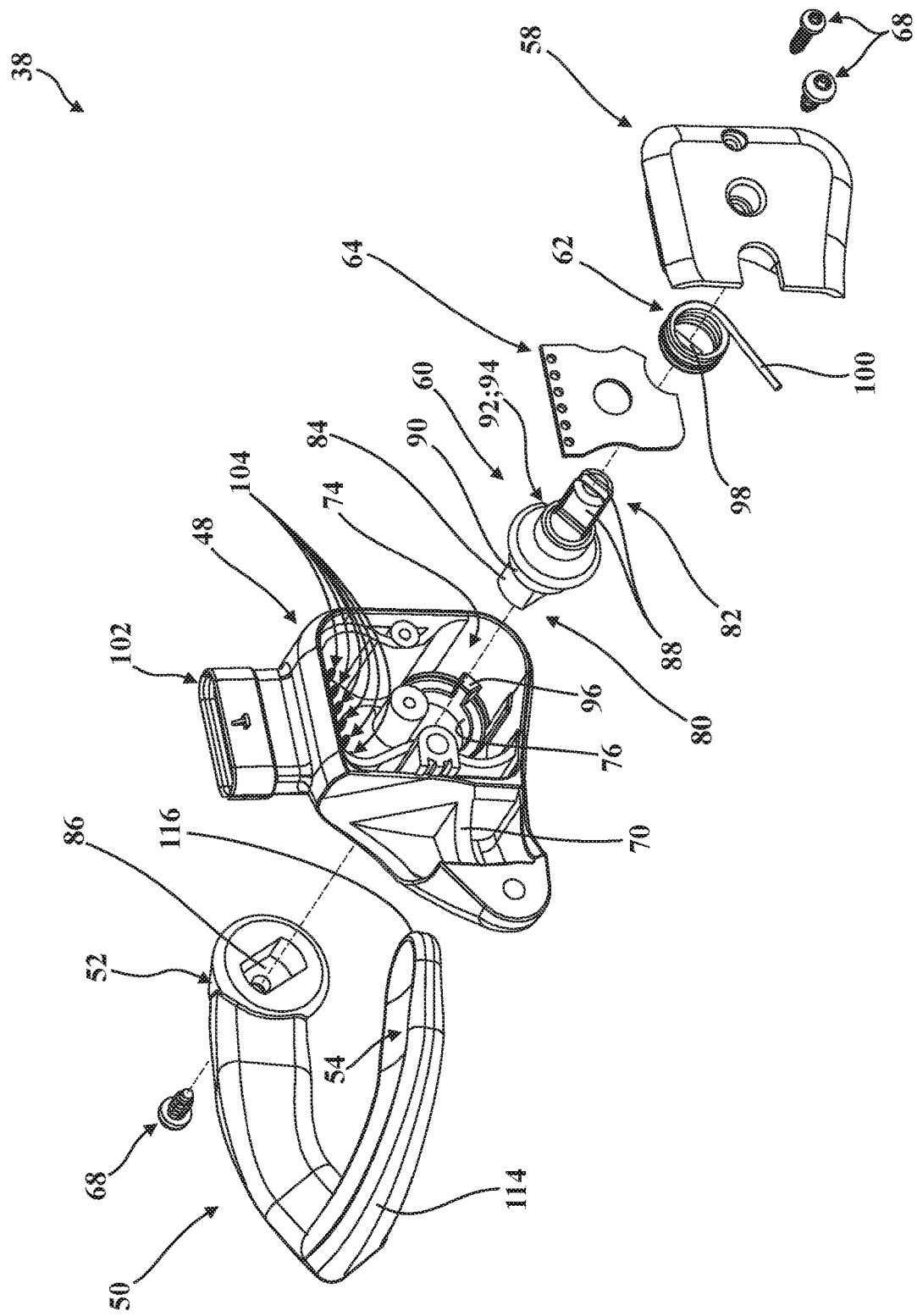
FIG. 9 is another exploded perspective view of the portions of the throttle assembly of FIG. 8.

As noted above, the housing 48 defines the pivot axis PA. To this end, and as is best depicted in FIG. 9 (see also FIGS. 8 and 10A-10B), the housing 48 defines an inner chamber, generally indicated at 74, and a bore 76 formed extending along the pivot axis PA from the inner chamber 74 to outside of the housing 48. As is described in greater detail below, the inner chamber 74 generally accommodates the pivot shaft 60, the biasing element 62, and the printed circuit board assembly 64 therein, and the bore 76 rotatably supports the pivot shaft 60 for movement concurrent with the thumb trigger 50 between the first and second trigger positions 50A, 50B. The biasing element 62 is interposed between the pivot shaft 60 and the housing 48 so as to urge the thumb trigger 50 toward the first trigger position 50A. The cover 58 is removably secured to the housing 48 adjacent the inner chamber 74 with one or more fasteners 68, and defines a boss 78 (see FIG. 8) that helps rotatably support the pivot shaft 60 for movement about the pivot axis PA. Here, it will be appreciated that one or more seals, gaskets, and the like may be provided between the cover 58 and the housing 48 to prevent ingress of water and/or foreign contaminants into the inner chamber 74. Moreover, it will be appreciated that the housing 48 could accommodate or otherwise support the pivot shaft 60 for rotation about the pivot axis PA in a number of different ways, such as with one or more bearings, bushings, and the like, without departing from the scope of the present disclosure.

The pivot shaft 60 is rotatably supported by the housing 48 and generally extends along the pivot axis PA between a first end 80 and a second end 82. The first end 80 is rotatably coupled to the trigger interface 52 of the thumb trigger 50 for concurrent movement between the first and second trigger positions 50A, 50B. To this end, the pivot shaft 60 comprises a keyed coupler 84 disposed at the first end 80 (see FIG. 8) which has a generally rounded-rectangular profile and is configured to be received in a correspondingly-shaped keyed receptacle 86 (see FIG. 9) formed in the trigger interface 52 of the thumb trigger 50 so as to facilitate concurrent movement of the pivot shaft 60 and the thumb trigger 50 about the pivot axis PA. Here, a fastener 68 is employed to couple the thumb trigger 50 to the pivot shaft 60. However, it will be appreciated that other configurations are contemplated, and the pivot shaft 60 could be operatively attached to the thumb trigger 50 for concurrent rotation in other ways without departing from the scope of the present disclosure. By way of non-limiting example, it is contemplated that the pivot shaft 60 could be formed integrally with the thumb trigger 50 in certain embodiments.

The pivot shaft 60 also comprises a pair of fingers 88, a bearing portion 90, and a flange portion 92. The fingers 88 are arranged at the second end 82, are rotatably supported by the boss 78 formed in the cover 58, and interface with the biasing element 62 as described in greater detail below. The bearing portion 90 is arranged between the flange portion 92 and the keyed coupler 84, and is rotatably supported by the boss 78 formed in the housing 48. The flange portion 92 is shaped so as to be disposed within the inner chamber 74 adjacent to the biasing element 62 and the printed circuit board assembly 64, and defines a rotation limiter, generally indicated at 94. As is depicted schematically in FIGS. 10A-10B, the rotation limiter 94 is configured to abut portions of a brace 96 (see also FIG. 9) formed in the inner chamber 74 of the housing 48 adjacent to the bore 76 in order to limit rotation of the pivot shaft 60 about the pivot axis PA between two discrete positions corresponding to the first trigger position 50A and the second trigger position 50B.

In the representative embodiment illustrated herein, the biasing element 62 is realized as a torsional spring with an inner tang 98 and an outer tang 100. The inner tang 98 is arranged so as to be accommodated between the pair of fingers 88 of the pivot shaft 60, and the outer tang 100 is arranged so as to contact a portion of the housing 48 and/or a portion of the cover 58 from within the inner chamber 74 (not shown in detail). Here, rotation of the pivot shaft 60 causes corresponding movement of the inner tang 98, which tensions the biasing element 62 in response to resistance caused by contact occurring between the outer tang 100 and the housing 48. Potential energy stored in the biasing element 62 urges the pivot shaft 60 to rotate toward the first trigger position 50A in an absence of engagement with the thumb trigger 50. Those having ordinary skill in the art will appreciate that the biasing element 62 could be configured or arranged in a number of different ways sufficient to bias the thumb trigger 50 toward the first trigger position 50A without departing from the scope of the present disclosure.

As noted above, the throttle assembly 38 is configured to communicate the relative position of the thumb trigger 50 between the first and second trigger positions 50A, 50B to the controller 66 which, in turn, can adjust the operation of the engine 40 in response. As is depicted schematically in FIGS. 10A-10B, in order to facilitate communication with the controller 66, a connector 102 with one or more terminals 104 is provided in communication with a sensor arrangement, generally indicated at 106. The connector 102 and the terminals 104 are configured to removably secure to a wiring harness electrical connector 108 (not shown in detail) of the vehicle 30 which, in turn, connects to the controller 66. In the illustrated embodiment, the connector 102 is formed integrally with the housing 48, such as by over-molding the housing 48 around the terminals 104. However, it will be appreciated that the connector 102 could be formed separately from the housing 48 in some embodiments. The terminals 104 are also disposed in electrical communication with the printed circuit board assembly 64, such as by a wired or soldered connection.

The sensor arrangement 106 generally comprises one or more emitters (e.g., a first emitter 110A, a second emitter 110B) operatively attached to the pivot shaft 60 for concurrent movement about the pivot axis PA (depicted attached to the flange portion 92 in FIGS. 10A-10B), and one or more detectors (e.g., a first detector 112A, a second detector 112B) operatively attached to the printed circuit board assembly 64 supported in the inner chamber 74 of the housing 48 for determining a position of the one or more emitters 110A, 110B as the thumb trigger 50 moves concurrently with the pivot shaft 60 between the first and second trigger positions 50A, 50B. The one or more detectors 112A, 112B are responsive to movement and/or changes in the position of the one or more emitters 110A, 110B resulting from corresponding movement of the thumb trigger 50 between the trigger positions 50A, 50B.

In one embodiment, the one or more emitters 110A, 110B comprise magnets, and the one or more detectors 112A, 112B are responsive to predetermined changes in magnetic fields generated by the magnet(s) to determine the relative position of the one or more emitters 110A, 110B. In this illustrative example, the one or more detectors 112A, 112B may be of any suitable type sufficient to sense and respond to changes in magnetic fields (e.g., hall-effect sensors). Moreover, it is conceivable that the one or more emitters 110A, 110B could be manufactured from an iron-based material and the one or more detectors 112A, 112B could generate magnetic field(s) capable of responding to changes in the generated field(s) due to interaction with the iron-based material of the one or more emitters 110A, 110B. Thus, it is conceivable that the one or more emitters 110A, 110B may also be realized as a ferrous enamel, coating, paint, or the like. In one embodiment, the one or more detectors 112A, 112B are disposed in electrical communication with the controller 66 such that operation of the engine 40 of the vehicle 30 can be adjusted or changed via the controller 66 based at least partially on positional changes of the thumb trigger 50 between the first and second trigger positions 50A, 50B. It will be appreciated that the sensor arrangement 106 depicted schematically in FIGS. 10A-10B is exemplary, and other configurations are contemplated.

Referring again to FIGS. 2A-10B, as noted above, the thumb trigger 50 generally comprises the trigger interface 52 supported for concurrent rotation about the pivot axis PA with the pivot shaft 60, and the thumb pad 54 arranged for engagement by the rider, with the thumb trigger 50 being shaped and arranged such that at least a portion of the thumb pad 54 remains on the rider side RS of the longitudinal reference plane as the thumb trigger 50 moves between the first trigger position 50A and the second trigger position 50B (compare FIGS. 4A-4B). The thumb trigger 50 also comprises a trigger body 114 extending between the trigger interface 52 and a trigger end 116 adjacent to or otherwise formed as a part of the thumb pad 54. Here, the trigger body 114 has a generally C-shaped profile that extends around the housing axis UA between the trigger interface 52 and the thumb pad 54. More specifically, the trigger body 114 extends from the trigger interface 52 on the rider side RS, across the longitudinal reference plane LRP to the forward side FS, around the housing axis UA, and back across the longitudinal reference plane LRP to the thumb pad 54 on the rider side RS. It will be appreciated that the thumb pad 54 is defined by or otherwise formed as a part of or is the trigger body 114 up to and including the trigger end 116 and, as noted above, is disposed on the rider side RS of the longitudinal reference plane LRP when the thumb trigger 50 is disposed in both the first and second trigger positions 50A, 50B (see FIGS. 4A-4B).

As is best shown in FIGS. 4A-4B, both the trigger interface 52 of the thumb trigger 50 and the first end 80 of the pivot shaft 60 are disposed on the rider side RS of the longitudinal reference plane LRP and also on the upper side US of the vertical reference plane VRP. Furthermore, at least a portion of the thumb pad 54 of the thumb trigger 50 is arranged on the lower side LS of the vertical reference plane VRP, and remains on the lower side LS as the thumb trigger 50 moves between the first and second trigger positions 50A, 50B. Moreover, the trigger body 114 of the thumb trigger 50 also extends from the trigger interface 52 across the vertical reference plane VRP from the upper side US and toward the lower side LS to the thumb pad 54. This configuration helps ensure that at least a portion of the thumb pad 54 is disposed on the rider side RS of the longitudinal reference plane LRP irrespective of how the thumb trigger 50 is rotated about the pivot axis PA between the first and second trigger positions 50A, 50B. Thus, the rider is able to consistently and reliably access the thumb pad 54 from the rider side RS of the longitudinal reference plane LRP, and does not have to sacrifice the ability to maintain firm engagement with the grip 36 that might otherwise occur with conventional designs that effectively require the rider to significantly loosen their engagement in order to reach and/or fully actuate a conventional thumb trigger.

In addition to curving around housing axis UA as described above, the trigger body 114 of the thumb trigger 50 both twists and curves between the trigger interface 52 and the thumb pad 54 adjacent the trigger end 116, which affords a smooth, tapered, and ergonomic profile. This configuration allows the thumb trigger 50 to be comfortably engaged by the rider's thumb from a broad number of riding positions (e.g., sitting and standing) without necessitating that the rider significantly loosen their engagement of the grip 36 when changing between riding positions, and ensures that the rider can engage the thumb pad 54 between the first and second trigger positions 50A, 50B while firmly grasping the grip 36 from different riding positions. This configuration also ensures that the rider's thumb will not become "trapped" between the thumb pad 54 and the grip 36 when transitioning between riding positions. By way of illustrative example, if the rider were to need to quickly transition from a sitting position to a standing position, articulation or movement of the hand grasping the grip 36 would not tend to move the thumb trigger 50 toward the second trigger position 50B, which might otherwise cause unintended acceleration of the vehicle 30. Rather, with the throttle assembly 38 and/or control system 32 of the present invention, this type of hand articulation or movement would not generally cause the thumb trigger 50 to move inadvertently because of how the trigger body 114 is shaped and arranged to engage the rider's thumb at the thumb pad 54. Moreover, no part of the trigger body 114 would "trap" or otherwise impede movement of the rider's thumb away from the grip 36, such as may occur during an emergency situation or when changing between riding positions. Rather, the thumb trigger 50 is configured such that the rider can readily disengage the thumb pad 54 if desired, with or without releasing or otherwise adjusting their engagement with the grip 36.

The arrangement of the pivot axis PA employed by the throttle assembly 38, along with the configuration of the thumb trigger 50 that facilitates maintaining a portion of the thumb pad 54 on the rider side RS of the longitudinal reference plane LRP, positions the trigger interface 52 above the pivoting joint of the rider's thumb with the pivot axis PA extending through the rider's hand adjacent to the pivoting joint (see FIGS. 6A-6B). This allows the thumb trigger 50 and the rider's thumb to travel throughout the same path of motion between the first and second trigger positions 50A, 50B, thereby ensuring that the rider can maintain firm engagement with the grip 36. As noted above, movement of the thumb trigger 50 in this "sweeping" manner about the pivot axis PA relative to the housing 48 (and, thus, relative to the grip 36 and the handlebars 34) follows the natural movement of the rider's thumb throughout the full range of motion between the first and second trigger positions 50A, 50B. This significantly improves comfort and prevents painful pressure points from developing in the rider's hand.

In this way, the control system 32 and throttle assembly 38 of the present invention afford significant advantages in connection with operating vehicles 30 equipped with handlebars 34. Specifically, the throttle assembly 38 allows the rider to move the thumb trigger 50 between the first and second trigger positions 50A, 50B in a way that follows natural movement of the thumb while, at the same time, allowing the rider to modulate vehicle speed in a simple, consistent, and reliable manner and without sacrificing the ability to maintain firm engagement with the grip 36. Furthermore, it will be appreciated that the throttle assembly 38 of the present invention provides improved functionality and usability in connection with a number of different types of handlebar-equipped vehicles 30 and, at the same time, reduces the cost and complexity of manufacturing and assembling throttle assemblies 38 which can operate reliably and predictably in a number of different environments.

The invention has been described in an illustrative manner, and it is to be understood that the terminology which has been used is intended to be in the nature of words of description rather than of limitation. Those having ordinary skill in the art will appreciate that many modifications and variations of the present invention are possible in light of the above teachings. It is, therefore, to be understood that the invention may be practiced otherwise than as specifically described.

The invention claimed is:

1. A control system for use by a rider of a vehicle, said control system comprising:
   a handlebar arranged for engagement by the rider to steer the vehicle, said handlebar comprising a handlebar end;
   a grip coupled to said handlebar end and extending along a grip axis; and
   a throttle assembly to modulate acceleration of the vehicle, said throttle assembly comprising:
   a housing having a mount adapted for attachment to said handlebar adjacent to said grip with at least a portion of said housing defining a housing axis arranged coincident to said grip axis and laying in a longitudinal reference plane defining a forward side and a rider side, and with said housing further defining a pivot axis, and
   a thumb trigger arranged for movement relative to said housing between a first trigger position and a second trigger position, said thumb trigger comprising a trigger interface supported for rotation about said pivot axis, and a thumb pad arranged for engagement by the rider;

wherein said pivot axis is arranged at an oblique angle relative to said housing axis taken normal to said longitudinal reference plane such that at least a portion of said thumb pad remains on said rider side as said thumb trigger moves between said first trigger position and said second trigger position in a sweeping manner about said pivot axis relative to said housing to follow the natural movement of the thumb, wherein said thumb trigger further comprises a trigger body extending from said trigger interface across said longitudinal reference plane to said forward side, around said housing axis, and toward said rider side to said thumb pad, wherein said trigger body of said thumb trigger has a generally C-shaped profile extending around said housing axis between said trigger interface and said thumb pad, and wherein a length of said trigger body extending from said trigger interface across said longitudinal reference plane to said forward side is longer than a length of said trigger body extending toward said rider side to said thumb pad.

2. The control system as set forth in claim 1, wherein said trigger interface of said thumb trigger is arranged on said rider side of said longitudinal reference plane.

3. The control system as set forth in claim 1, wherein said housing axis is further disposed laying in a vertical reference plane arranged perpendicular to said longitudinal reference plane and defining an upper side and a lower side; and wherein said trigger interface of said thumb trigger is arranged on said upper side of said vertical reference plane.

4. The control system as set forth in claim 3, wherein at least a portion of said thumb pad of said thumb trigger is arranged on said lower side of said vertical reference plane.

5. The control system as set forth in claim 1, wherein said housing axis is further disposed laying in a vertical reference plane arranged perpendicular to said longitudinal reference plane and defining an upper side and a lower side; and wherein said trigger body of said thumb trigger extends from said trigger interface across said vertical reference plane toward said lower side to said thumb pad.

6. The control system as set forth in claim 1, wherein said pivot axis is disposed laying in a pivot reference plane arranged parallel to said longitudinal reference plane.

7. The control system as set forth in claim 1, further comprising a pivot shaft rotatably supported by said housing and extending along said pivot axis between a first shaft end and a second shaft end, with said first shaft end coupled to said trigger interface of said thumb trigger for concurrent movement between said first trigger position and said second trigger position.

8. The control system as set forth in claim 7, wherein said housing axis is further disposed laying in a vertical reference plane arranged perpendicular to said longitudinal reference plane and defining an upper side and a lower side; and wherein said first end of said pivot shaft is disposed on said rider side of said longitudinal reference plane and on said upper side of said vertical reference plane.

9. A throttle assembly for use by a rider of a vehicle having a handlebar with a grip coupled to the handlebar and extending along a grip axis, said throttle assembly comprising:

a housing having a mount adapted for attachment to the handlebar adjacent the grip with at least a portion of said housing defining a housing axis adapted to be substantially coincident to the grip axis and laying in a longitudinal reference plane defining a forward side and a rider side, and with said housing further defining a pivot axis; and a thumb trigger arranged for movement relative to said housing between a first trigger position and a second trigger position, said thumb trigger comprising a trigger interface supported for rotation about said pivot axis, and a thumb pad arranged for engagement by the rider, wherein said thumb trigger further comprises a trigger body extending from said trigger interface across said longitudinal reference plane to said forward side, around said housing axis, and toward said rider side to said thumb pad, wherein said trigger body of said thumb trigger has a generally C-shaped profile extending around said housing axis between said trigger interface and said thumb pad, wherein a length of said trigger body extending from said trigger interface across said longitudinal reference plane to said forward side is longer than a length of said trigger body extending toward said rider side to said thumb pad;

wherein said pivot axis is arranged at an oblique angle relative to said housing axis taken normal to said longitudinal reference plane such that at least a portion of said thumb pad remains on said rider side as said thumb trigger moves between said first trigger position and said second trigger position in a sweeping manner about said pivot axis relative to said housing to follow the natural movement of the thumb.

10. The throttle assembly as set forth in claim 9, wherein said trigger interface of said thumb trigger is arranged on said rider side of said longitudinal reference plane.

11. The throttle assembly as set forth in claim 9, wherein said housing axis is further disposed laying in a vertical reference plane arranged perpendicular to said longitudinal reference plane and defining an upper side and a lower side; and wherein said trigger interface of said thumb trigger is arranged on said upper side of said vertical reference plane.

12. The throttle assembly as set forth in claim 11, wherein at least a portion of said thumb pad of said thumb trigger is arranged on said lower side of said vertical reference plane.

13. The throttle assembly as set forth in claim 9, wherein said housing axis is further disposed laying in a vertical reference plane arranged perpendicular to said longitudinal reference plane and defining an upper side and a lower side; and wherein said trigger body of said thumb trigger extends from said trigger interface across said vertical reference plane toward said lower side to said thumb pad.

14. The throttle assembly as set forth in claim 9, wherein said pivot axis is disposed laying in a pivot reference plane arranged parallel to said longitudinal reference plane.

15. The throttle assembly as set forth in claim 9, further comprising a pivot shaft rotatably supported by said housing and extending along said pivot axis between a first shaft end and a second shaft end, with said first shaft end coupled to said trigger interface of said thumb trigger for concurrent movement between said first trigger position and said second trigger position.

16. The throttle assembly as set forth in claim 15, wherein said housing axis is further disposed laying in a vertical reference plane arranged perpendicular to said longitudinal reference plane and defining an upper side and a lower side; and wherein said first end of said pivot shaft is disposed on said rider side of said longitudinal reference plane and on said upper side of said vertical reference plane.

* * * * *